United States Patent
Boehnke et al.

(10) Patent No.: US 11,633,796 B2
(45) Date of Patent: Apr. 25, 2023

(54) PROCESS FOR PRODUCING A PLATE HEAT EXCHANGER AND PLATE HEAT EXCHANGER

(71) Applicant: BENTELER AUTOMOBILTECHNIK GMBH, Paderborn (DE)

(72) Inventors: Max Boehnke, Paderborn (DE); Ulrich Huschen, Lichtenau (DE); Elmar Grussmann, Altenbeken-Buke (DE); Ulrich Rusche, Werl (DE); Jochem Grewe, Salzkotten (DE)

(73) Assignee: BENTELER AUTOMOBILETECHNIK GMBH, Paderborn (DE)

( * ) Notice: Subject to any disclaimer, the term of this patent is extended or adjusted under 35 U.S.C. 154(b) by 0 days.

(21) Appl. No.: 17/544,653

(22) Filed: Dec. 7, 2021

(65) Prior Publication Data
US 2022/0088693 A1 Mar. 24, 2022

Related U.S. Application Data

(62) Division of application No. 16/944,887, filed on Jul. 31, 2020, now Pat. No. 11,400,532.

(30) Foreign Application Priority Data

Aug. 1, 2019 (DE) .......................... 102019120862.9

(51) Int. Cl.
*B23K 1/00* (2006.01)
*F28D 9/00* (2006.01)
(Continued)

(52) U.S. Cl.
CPC ............ *B23K 1/0012* (2013.01); *B23P 15/26* (2013.01); *F28D 9/0056* (2013.01); *F28F 3/086* (2013.01);
(Continued)

(58) Field of Classification Search
CPC ........ B23K 1/0012; B23K 1/008; B23K 1/20; B23K 3/087; B23K 2101/14;
(Continued)

(56) References Cited

U.S. PATENT DOCUMENTS 5,837,070 A * 11/1998 Sainfort .................. C22C 21/04
420/544
6,409,072 B1 6/2002 Breuer et al.
(Continued)

FOREIGN PATENT DOCUMENTS

CN 101691961 A 4/2010
DE 4426097 A1 1/1996
(Continued)

OTHER PUBLICATIONS

Office Action for Chinese Application No. 202010755898.9 dated Jan. 28, 2022; 11 pp.
(Continued)

*Primary Examiner* — Lee A Holly
(74) *Attorney, Agent, or Firm* — Hauptman Ham, LLP

(57) ABSTRACT

A plate heat exchanger has two metal plates brought into abutment, with a solder material between the plates. The plates are heated up to a first temperature. The plates are placed into a mold, the mold surfaces of which have cavities for envisaged channel structures. Channel structures are formed by local internal pressure forming of at least one plate under pressurization by the tool. The plates are heated up to a second temperature. The plates are solder bonded at the abuted surfaces. A plate heat exchanger has two metal plates, wherein channel structures have been formed in at least one plate and the plates are bonded to one another by soldering away from the channel structures. Eutectic microstructures having a longest extent of less than 50 micrometers are formed in the solder layer.

17 Claims, 3 Drawing Sheets

(51) Int. Cl.
    *F28F 21/08*     (2006.01)
    *B23P 15/26*     (2006.01)
    *F28F 3/08*     (2006.01)
    *F28F 9/00*     (2006.01)

(52) U.S. Cl.
    CPC ............ *F28F 21/084* (2013.01); *F28F 9/001* (2013.01); *F28F 2275/04* (2013.01)

(58) Field of Classification Search
    CPC ... B23K 2103/10; B23P 15/26; F28D 9/0056; F28D 9/0081; F28F 3/086; F28F 21/084; F28F 9/001; F28F 2275/04; F28F 2275/045; F28F 9/0246; F28F 3/14; B21D 53/045
    See application file for complete search history.

(56) References Cited

U.S. PATENT DOCUMENTS

| | | | | |
|---|---|---|---|---|
| 10,024,611 | B2* | 7/2018 | Fujita | C22F 1/053 |
| 2002/0069506 | A1* | 6/2002 | Brodt | B21D 35/007 |
| | | | | 29/432 |
| 2002/0119079 | A1* | 8/2002 | Breuer | B01J 19/0093 |
| | | | | 228/111.5 |
| 2006/0276334 | A1 | 12/2006 | Balduf et al. | |
| 2009/0308585 | A1* | 12/2009 | Chen | F28F 1/325 |
| | | | | 165/185 |
| 2010/0288479 | A1 | 11/2010 | Meng et al. | |
| 2015/0337413 | A1* | 11/2015 | Kim | C22C 21/12 |
| | | | | 420/544 |
| 2017/0263987 | A1 | 9/2017 | Kopp et al. | |
| 2017/0320170 | A1* | 11/2017 | Yanagawa | B23K 35/28 |

FOREIGN PATENT DOCUMENTS

| | | |
|---|---|---|
| DE | 10049660 A1 | 4/2002 |
| DE | 102010051106 A1 | 5/2012 |
| DE | 102014219812 A1 | 3/2016 |
| DE | 102011077154 B4 | 5/2017 |
| DE | 102016107946 A1 | 11/2017 |
| DE | 102012009148 B4 | 9/2018 |
| EP | 1195208 A2 | 4/2002 |
| WO | 9637335 A1 | 11/1996 |
| WO | 9837457 A1 | 8/1998 |
| WO | 2005011858 A1 | 2/2005 |
| WO | 2009126339 A2 | 10/2009 |
| WO | 2010132018 A1 | 11/2010 |

OTHER PUBLICATIONS

Office Action for German Application No. 10 2019 120 862.9 dated Dec. 22, 2020; 11pp.
Office Action for German Application No. 10 2019 120 862.9 dated Jun. 19, 2020; 14pp.
European Search Report for European Application No. 20186967.4 dated Dec. 11, 2020; 18pp.
Extended European Search Report for European Application No. 21156850.6 dated May 3, 2021; 14pp.
Notice of Allowance for U.S. Appl. No. 16/944,887 dated Mar. 22, 2022; 30pp.

* cited by examiner

PROCESS FOR PRODUCING A PLATE HEAT EXCHANGER AND PLATE HEAT EXCHANGER

RELATED APPLICATIONS

The present application is a divisional of U.S. application Ser. No. 16/944,887 filed Jul. 31, 2020 which claims priority of German Application Number 10 2019 120 862.9 filed Aug. 1, 2019, the disclosure of which is hereby incorporated by reference herein in its entirety.

FIELD

The disclosure relates to a process for producing a plate heat exchanger and to a plate heat exchanger.

BACKGROUND

Plate heat exchangers are used, for example, to control the temperature of storage units for electrical energy in motor vehicles. A known method is to use a large-area plate heat exchanger to control the temperature of all storage units arranged a vessel. Likewise known is the control of the temperature of individual modules of storage units. The storage units are to be cooled in operation or in the course of charging.

Plate heat exchangers are additionally usable in many other technical fields and therefore have a wide range of dimensions.

DE 10 2010 051 106 A1 discloses a plate heat exchanger having two plate elements made of aluminum. Convexities are shaped into the plate elements, and these collectively form at least one cooling channel. The plate elements are then bonded to one another by welding. This production process necessitates a separate forming mold. Welding is an inconvenient and costly process, and the length of the weld seam additionally rises with rising dimensions.

DE 10 2014 219 812 A1 discloses a process in which a separating agent is disposed between two metal sheets in order to define channel structures. The metal sheets are inextricably bonded to one another in a roll bonding process. Subsequently, the regions treated with separating agent are blown up in order to form the channel structures. In roll bonding, however, dimensional accuracy falls with increasing plate size. The selection of possible material pairs for the metal sheets is limited.

Finally, it is also known that the two plates can be soldered to one another in the production of a plate heat exchanger. DE 2012 009 148 B4 discloses a component made of two layers of metal, at least one of which is profiled, so as to form a cavity between the two layers in order to convey a medium therein. The two layers may also be bonded to one another by soldering. Soldering is customarily performed in an oven through which the components are conveyed. As well as the oven, there are also a forming mold and special fixing frames for the components in the oven, which entails high capital costs. The soldering operation takes 1 to 2 hours, which is associated with long cycle times. This long-lasting thermal stress additionally has the disadvantage that magnesium precipitates that weaken the solder bond occur in the case of relatively high-strength aluminum alloys. This means that these materials are unusable for a plate heat exchanger.

SUMMARY

An object of the present disclosure is to provide a process that enables the inexpensive, dimensionally accurate and flexible (in terms of the materials) production of plate heat exchangers having long lifetime. A further object of the disclosure is to provide a plate heat exchanger which is inexpensive and flexibly producible in terms of the materials and has a long lifetime.

The disclosure relates to processes for producing a plate heat exchanger having the following steps:
- providing two plates of a metallic material, wherein the plates are brought into abutment with a solder material disposed between the plates,
- heating the plates to a first temperature,
- inserting the plates into a mold having mold surfaces that have cavities for envisaged channel structures,
- forming channel structures by local internal pressure forming of at least one plate under pressurization by the mold,
- heating the plates to a second temperature,
- solder bonding of the plates in the abuted areas.

Herein, when the two plates are brought into abutment (or one plate abuts the other plate) with a solder material disposed between the plates, the two plates are in direct contact in at least one region where the solder material is not provided and/or, in at least one region where the solder material is provided, the two plates would have been in direct contact but for the solder material. In some embodiments, the abutment of the two plates with the solder material disposed therebetween allows for at least a point or a region of direct contact between opposing surfaces of the two plates. The plates are not necessarily being in direct contact across the entirety of their opposing surfaces, because the solder material in between may prevent the opposing surfaces of the plates from directly touching each other in one or more regions.

The plates together with the solder material disposed between the plates are first heated to a first temperature. This temperature is chosen such that the material of at least one of the plates is readily formable, but the solder material has not yet melted. The first temperature is 200° C. to 550° C., or 300° C. to 350° C.

In internal pressure forming, a medium is guided between the plates under high pressure. In the region of the cavities, the material of the plates can deform and fit to the inner surfaces of the cavities, which creates hollow channel structures, while the plates remain fully abuted in the regions outside the cavities. At the same time, the plates are held in position relative to one another. The process leads through the reproducible formation of precise channel structures in a mold, to a highly dimensionally accurate plate heat exchanger.

The internal pressure forming is effected by means of an inert gas, for example nitrogen. The gas may have been preheated.

In the forming of the channel structures, stiffness-increasing beads may be introduced into the plate heat exchanger, which are not in fluid connection with the channel structures.

The plates are subsequently heated to a second temperature in which the solder material melts and the solder bond forms in the abuted areas. This creates a stable bond between the plates. The second temperature is 550° C. to 650° C., or 600° C. to 615° C.

The plates are heated uniformly to the second temperature in their regions provided with solder material, where the temperature range ΔT over the plate is less than 50 K, or less than 10 K.

In at least one embodiment of the disclosure, the mold is heatable and the heating to the first temperature is effected in the mold. The plates are heated by means of thermal conduction, which leads to rapid heating of the plates. The internal pressure forming may be commenced directly on attainment of the first temperature to achieve shortening of the cycle times and to dispense with additional devices for heating and for transport of the plates.

The solder bonding of the plates is likewise effected in the mold under pressurization by the mold. This means that the plates, after the internal pressure forming remain in the mold and are heated further to the second temperature. This too is effected by the direct contact with the mold within a very short time. The plates are positioned so as to be immovable relative to one another, such that no more warpage or slip relative to one another is possible. This likewise leads to high dimensional accuracy in the plate heat exchangers.

The total process duration is a few minutes, which is considerably shorter than the customary dwell time in a soldering oven of up to several hours.

The mold is preheated to a temperature of 550° C. to 700° C., to a temperature of 600° C. to 650° C., or to a temperature of 615° C. to 625° C. Immediately after the plates have been inserted into the preheated mold, the plates and the solder material are heated, the speed of heating being proportionate to the temperature of the mold. This too contributes to a reduction in cycle times.

In at least one embodiment of the disclosure, sealing beads are provided adjacent to the cavities of the mold surfaces and/or around the mold circumference, in order to seal the resultant channel structures in the internal pressure forming. This means that the plates are locally pressed against one another at high pressure, such that the internal pressure forming in the region of the cavities is effected precisely and with high dimensional accuracy.

One plate is provided as base plate, the other plate as forming plate, and the channel structures are generated in the forming plate. This means that just one of the two plates is subjected to internal pressure forming and the mold has the necessary cavities only in one part of the mold. This reduces the cost and inconvenience associated with the provision of the mold. An additional function is assignable to the base plate, for example as base protection sheet.

The base plate has a thickness of 0.5 to 5 millimeters, or 1 to 2 millimeters.

The forming plate has a thickness of 0.2 to 2 millimeters, or 0.8 to 1 millimeter.

The thickness of the plates also depends on the material used, for example the specific alloy and/or pretreatment, and its properties.

In at least one embodiment of the disclosure, the plates have an aluminum alloy, for example, a high-strength aluminum alloy. The individual plates here may have different alloys. These may be alloys that are typically used in soldering processes, for example alloys of the 3000 series, for instance 3003 or 3005. However, the alloys may also be of the 5000 series. Alloys of the 6000 and 7000 series are generally considered to be difficult to solder, since magnesium precipitates form on the surface during the generally long period of heating to the soldering temperature. However, the process of the disclosure enables very rapid heating of the plates in the region of seconds or a few minutes, by contrast to up to several hours in conventional oven soldering processes. This means that the magnesium precipitates can also be largely avoided. It is thus possible, by virtue of the process of the disclosure, to also consider aluminum alloys for use in a plate heat exchanger that typically cannot be used. Ultrahigh-strength aluminum alloys in turn enable additional functions that can be assumed by the plate heat exchanger, for example as structure component.

One of the two plates has been provided with a plated solder layer. This facilitates the handling of the plates and avoids an additional operating step in order to apply the solder.

The plates are arranged such that the solder-plated plate is disposed at the top in the mold. During the soldering operation, diffusion processes toward the lower plate can proceed assisted by gravity and ensure a more stable bond.

In addition, a connection opening is generated in at least one of the plates. This can be effected, for example, by punching, cutting or another method. The connection opening serves to accommodate a connecting element through which the cooling medium is later introduced or discharged.

In addition, a connecting element is disposed on or in this connection opening. The connecting element is disposed on or in the connection opening. The connecting element is disposed in the connection opening with a solder ring and/or a solder paste. In this way, the connection between connecting element and accompanying plate can be effected simultaneously with the solder bonding of the plates.

In addition, in at least one embodiment of the disclosure, the medium for the internal pressure forming is introduced through the connection opening. Thus, no additional connections are needed for the introduction of the medium for the internal pressure forming. The connections present in any case for the introduction or discharge of a cooling medium are utilized.

In the process of the disclosure, a mold is used, the mold surfaces of which have been provided with a coating in order to prevent adhesion of the plates. This may be, for example, a coating of ceramic or other suitable materials.

Together therewith or alternatively, a separating agent is disposed between the plates and the mold surfaces of the mold in order to prevent adhesion of the plates. The separating agent may, for example, be a suitable fluid which is applied to the plates or the mold surfaces of the mold. An alternative is a film sheet which is introduced between plate and mold. An alternative is a wear sheet fixed in the mold, including in a detachable manner.

In the internal pressure forming, a first pressure is applied by the mold and, in the solder bonding of the plates, a second pressure is applied by the mold, the first pressure being higher than the second pressure. In the forming operation, the plates are subjected to higher pressure in order to fix the plates relative to one another and to generate an opposing pressure to the medium introduced for internal pressure forming, and in order to seal the channel structures in order to achieve high dimensional accuracy. Thereafter, the pressure applied is reduced, which is associated with the rising temperature, since high temperatures promote the adhesion. The reduced pressure reduces normal stresses in the plates, which are a cause of the adhesion of plate material to the mold.

Such a variation in pressure can be enabled and assisted by spring-mounted molds. In the case of use of spring-mounted molds, the heating operation may be influenced by altering the conduction of heat between the mold and the plates through a variation in the contact pressure.

After the solder bonding of the plates, they are cooled down again. The cooling can be effected by contacting with a cooling medium in or after removal from the mold. Alternatively, the plate heat exchanger can also be transferred into a cooling mold or a cooling frame. Also possible is a combination of these or further process steps.

The medium for the internal pressure forming may be used for cooling or for assistance of the cooling process. If the medium is an inert gas, for example nitrogen, the formation of an oxide layer is prevented. The cooling is effected more evenly and reduces the formation of the plates that can be caused by internal stresses.

The cooling period between the solder bonding and the solder solidification is shorter than 60 seconds, shorter than 20 seconds, or shorter than 10 seconds. The effect of this short cooling time is that eutectic microstructures having a longest dimension of less than 50 micrometers form in the solder layer. In conventional processes, these microstructures form much coarser grains and form elongate acicular structures having a length of 200 micrometers or more. These form because, in conventional soldering methods, for example oven soldering, the cooling can take tens of minutes and the structures develop in this time. However, the effect of the fine-grain microstructure is that the solder bond is much more stable and fatigue-resistant. The fine-grain microstructure forms especially in the transition region between the abuted plates and the channel structures, and prevents premature cracks and the plates from splitting apart in this region which is highly stressed in operation. This distinctly increases the lifetime of plate heat exchangers of the disclosure.

The cooling is followed within less than 72 hours by a heat treatment at a temperature of 140° C. to 250° C. over a period of 20 minutes to 24 hours, of 20 minutes to 8 hours, or of 20 minutes to 2 hours. The strength properties of plate heat exchangers may be improved in the case of use of high- and ultrahigh-strength aluminum alloys.

The disclosure further relates to a plate heat exchanger comprising two plates of a metallic material, wherein channel structures are formed in at least one plate and the plates are bonded to one another by soldering outside the channel structures, characterized in that eutectic microstructures having a longest dimension of less than 50 micrometers are formed in the solder layer. As already elucidated above, such a microstructure leads to a permanently stable bond of the two plates and hence to a fatigue-resistant plate heat exchanger with long lifetime.

The eutectic microstructures are formed in solder accumulations in the transition region from the abuted plates to the channel structures. This region is subject to high stresses in operation when a cooling medium is passed through the channel structures. Consequently, formation of the microstructure at this point leads to improved resistance to cracks and splitting apart in this sensitive region.

The plate heat exchanger has been produced by a process of the disclosure.

The plate heat exchanger has been produced by internal pressure. In order to avoid repetition, reference is made to the above elucidations. The same is true of the features described hereinafter.

Furthermore, one of the plates is a base plate and one of the plates is a forming plate in which the channel structures are formed.

The base plate here has a thickness of 0.5 to 5 millimeters, or 1 to 2 millimeters.

The forming plate has a thickness of 0.2 to 2 millimeters, or 0.8 to 1 millimeter.

In addition, in at least one embodiment of the plate heat exchanger, at least one of the plates has a yield point Rp0.2 in the tensile test of more than 100 MPa, more than 140 MPa, or more than 160 MPa.

BRIEF DESCRIPTION OF THE DRAWINGS

The disclosure is described in more detail below with reference to drawings. The figures show.

DETAILED DESCRIPTION

Figure 1:
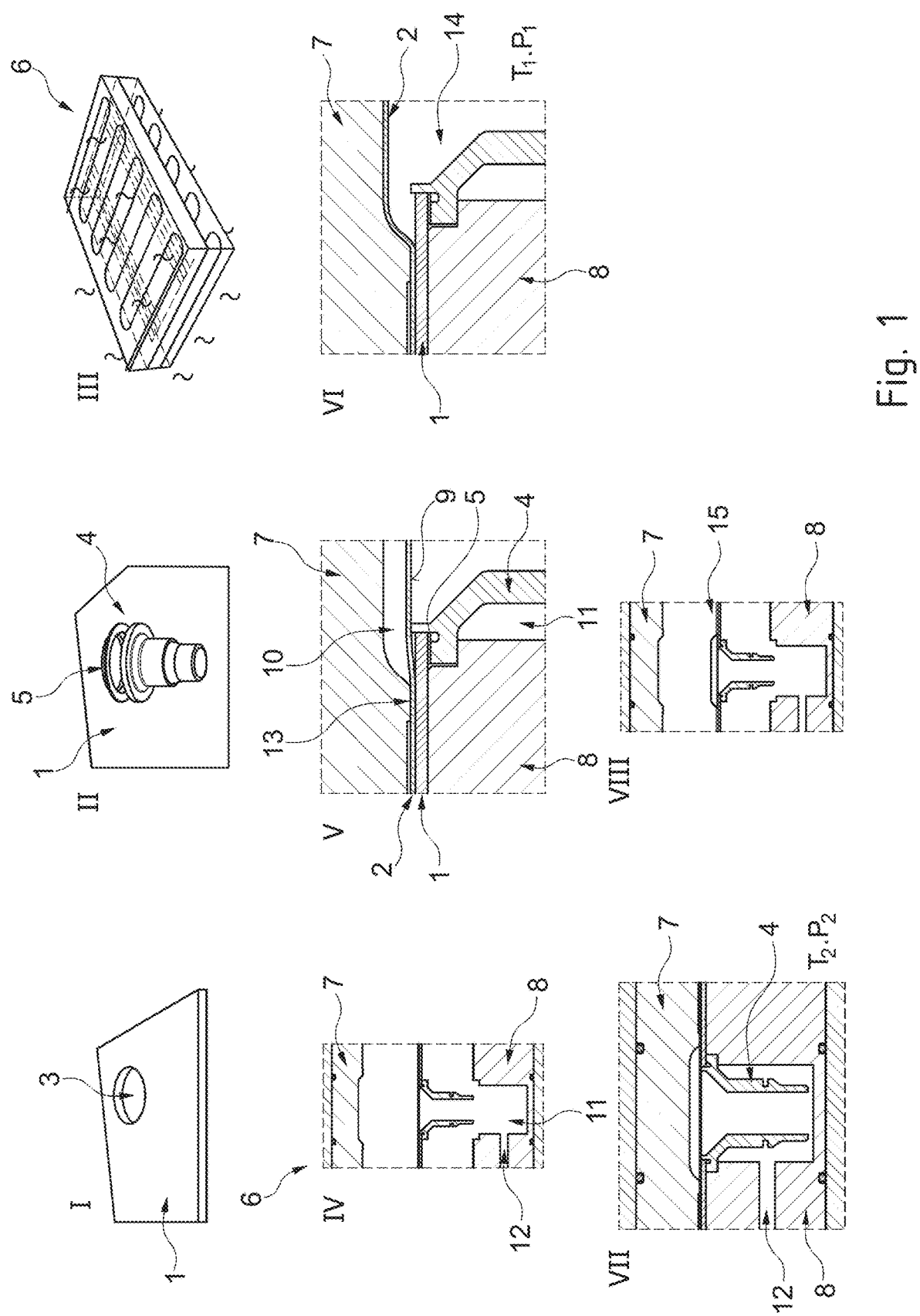
FIG. 1 a working example of a process in accordance with at least one embodiment FIG. 2 a time-temperature diagram of a process in accordance with at least one embodiment FIG. 3 a representation of the microstructure in the solder layer of a plate heat exchanger in accordance with at least one embodiment The figures use the same reference numerals for identical or similar components, even when there is no repeated description on grounds of simplification.
Figure 2:
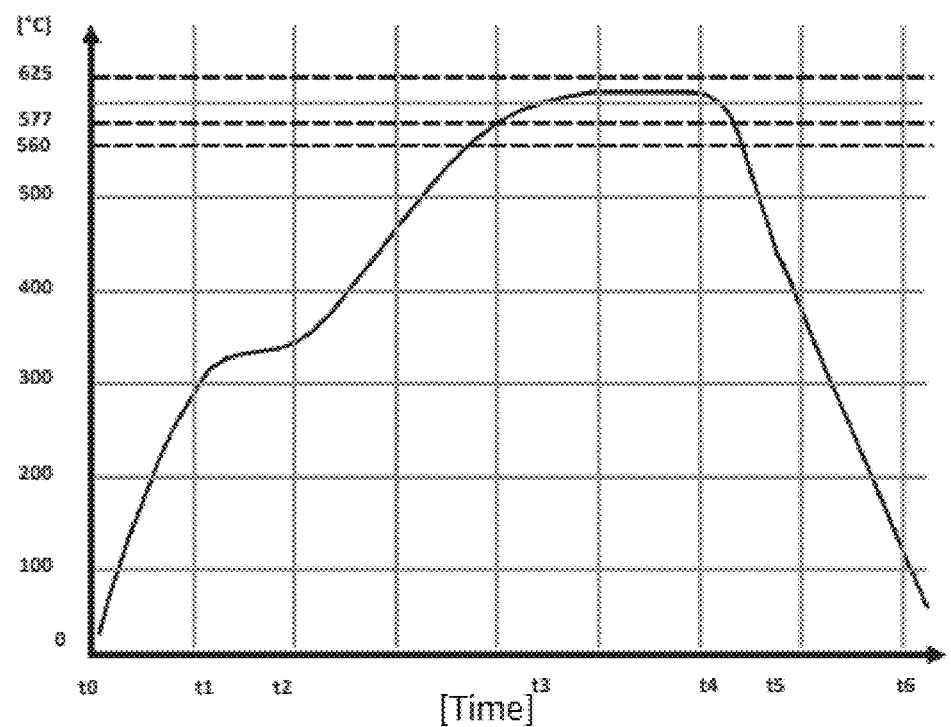

FIGS. 1 and 2 show a process of the disclosure for production of a plate heat exchanger and the associated temperature progression in schematic form. First of all, a base plate 1 and a forming plate 2 are provided. The plates here are of a 3000 series aluminum alloy, for example an alloy designated 3003, 3005, 3903 or 3905. The thickness of the base plate 1 here is 1.3 millimeters to 2 millimeters. The thickness of the forming plate 2 is 0.5 millimeter to 1.5 millimeters. The forming plate 2 has been plated with a solder material. A connection opening 3 is generated in the base plate 1. A connecting element 4 together with a solder ring 5 is disposed at the connection opening 3.

The base plate 1 and the forming plate 2 are brought into abutment and introduced into a preheated mold 6. The mold 6 has been preheated to a temperature of about 630° C. The mold 6 comprises an upper mold 7 and a lower mold 8. Cavities 10 have been introduced into the mold surface 9 of the upper mold 7, corresponding to the channel structures provided in the plate heat exchanger to be produced. The lower mold 8 has receiving openings 11 for the connecting element 4. Feed channels 12 for a medium 14 for internal pressure forming are connected to the receiving openings 11.

Then the mold 6 is closed. This corresponds to time t0 in the diagram in FIG. 2. The heat provided in the mold 6 is transferred to the plates 1, 2, which are thus heated.

At a time t1, an envisaged first temperature $T_1$ at which the internal pressure forming is started is attained. The specific time depends on the temperature of the mold 6 and the material and thickness of the plates 1, 2. In the case of plates 1, 2 of aluminum, owing to its good thermal conduction properties, the time span between t0 and t1 is only a few seconds. The first temperature $T_1$ in this working example is 300° C. to 350° C.

For the internal pressure forming, a medium 14, an inert gas such as nitrogen, is guided under pressure between the plates 1, 2 through the feed channel 12, the connecting element 4 and the connection opening 3. This deforms the forming plate 2 until it becomes abuted with the mold surface 9 of the upper mold 7. The mold 6 also subjects the plates 1, 2 to a first pressure $p_1$ in order to counteract the internal pressure of the medium 14 and in order to seal the resultant channel structures. Adjacent to the cavities 10 of the mold surfaces 9, sealing beads 13 are provided, which ensure that the forming operation takes place exclusively in the region of the cavities 10. Thus, high dimensional accuracy and forming precision are assured.

When the forming operation is complete (time t2), the plates 1, 2 are heated further. At about 560° C., in this illustrative process procedure, the solder material begins to melt. At a time t3, the second temperature $T_2$ is attained. The time span required for heating depends again on the materials used. The second temperature $T_2$ here is from 600° C. to 615° C., or about 610° C. The solder bonding of the plates 1, 2 commences with application of heat and a second pressure $p_2$ through the mold 6. This cohesively bonds the fully abutted regions of the plates 1, 2. At the same time, the connecting element 4 is cohesively bonded to the base plate 1 by the solder ring 5.

The second pressure $p_2$ is lower than the first pressure $p_1$, in order to counteract any possible adhesion of the aluminum plates 1, 2 to the mold 6. For this purpose, the upper mold 7 and/or lower mold 8 have/has a spring mount.

At a time t4, the solder bonding is complete. Thereafter, the mutually bonded plates 1, 2 are cooled back down to room temperature (time t6). For this purpose, the plate heat exchanger 15 is removed from the mold 6 and either transferred to a cooling mold or placed in a cooling frame.

The medium for the internal pressure forming may be used for cooling or for assistance of the cooling process. In the case of use of nitrogen as inert medium, the formation of an oxide layer is prevented. The cooling is effected somewhat more evenly and reduces deformation of the plates that can be caused by internal stresses.

There may optionally be further heat treatment steps during this period or thereafter.

At time t5, the solder material has solidified. The time span between t4 and t5 is very short and is only a few minutes or even seconds. The effect of the short cooling time before solder solidification is that eutectic microstructures having a longest dimension of less than 50 micrometers are formed in the solder layer.

Figure 3:
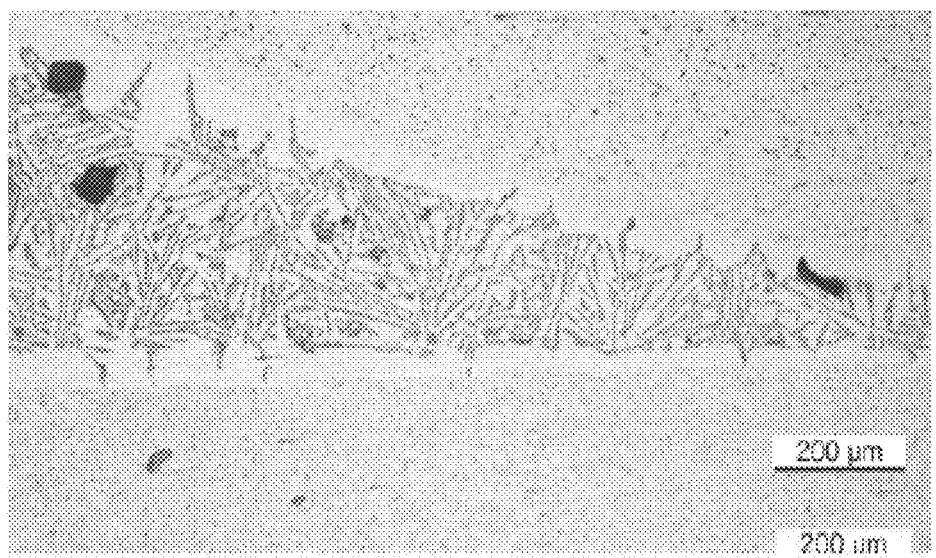
Figure 3:
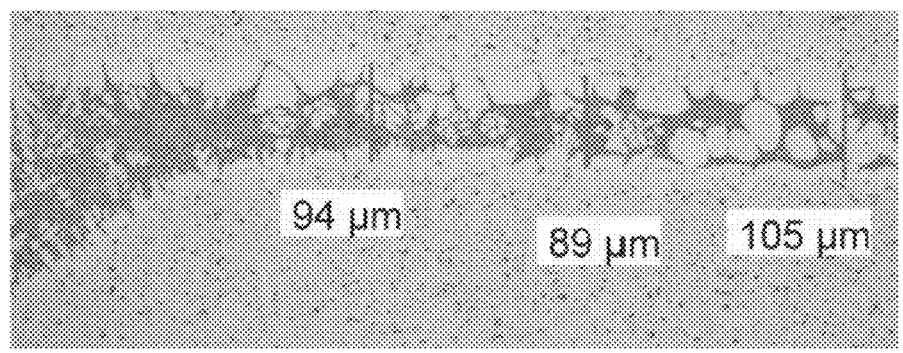

FIG. 3 compares two sections. The top image shows an accumulation of solder in the transition region between the channel structures and the abutted plates 1, 2 that would have been in the plane of the drawing on the right of the figure. This solder bond was generated in a conventional oven soldering process with long cooling times. Eutectic microstructures have formed, which are elongate or acicular and have a longitudinal extent of 200 micrometers or more.

By contrast, the bottom image shows a solder layer that has been produced by a process of the disclosure. The corresponding eutectic microstructures are formed in the dark regions. These have much finer grains than in the top image with extents of less than 50 micrometers. The effect of the fine-grain microstructure is that the solder bond is much more stable and fatigue-resistant. This is important especially in the region of the transition between the channel structures and the soldered regions, since high stresses that can lead to cracks and splitting-apart of the two plates 1, 2 occur there in operation.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A plate heat exchanger, comprising two metal plates, wherein
at least one of the plates has channel structures,
the plates are joined to one another by a solder layer away from the channel structures, and
the solder layer comprises eutectic microstructures having a longest dimension of less than 50 micrometers,
wherein at least one of the plates comprises a connection element and a solder ring, and the connection element is bonded to at least one of the plates by the solder ring.

2. The plate heat exchanger according to claim 1, wherein one of the plates is a base plate, and the other plate is a forming plate.

3. The plate heat exchanger according to claim 2, wherein the forming plate comprises the channel structures.

4. The plate heat exchanger according to claim 2, wherein the base plate has a thickness of 0.5 to 5.0 millimeters.

5. The plate heat exchanger according to claim 2, wherein the base plate has a thickness of 1.0 to 2.0 millimeters.

6. The plate heat exchanger according to claim 2, wherein the forming plate has a thickness of 0.2 to 2.0 millimeters.

7. The plate heat exchanger according to claim 2, wherein the forming plate has a thickness of 0.8 to 1.0 millimeters.

8. The plate heat exchanger according to claim 1, wherein the plates comprise an aluminum alloy.

9. The plate heat exchanger according to claim 8, wherein the aluminum alloy is a high strength aluminum alloy.

10. The plate heat exchanger according to claim 1, wherein the eutectic microstructures are formed in solder accumulations in a transition region from abutted areas of the plates to the channel structures.

11. The plate heat exchanger according to claim 1, wherein at least one of the plates comprises a connection opening.

12. The plate heat exchanger according to claim 1, wherein at least one of the plates comprises a connection opening, and the connection element is on or in the connection opening.

13. The plate heat exchanger according to claim 1, wherein the channel structures are formed by internal pressure forming of at least one of the plates.

14. The plate heat exchanger according to claim 1, further comprising stiffness- increasing beads, wherein the stiffness-increasing beads are not in fluid connection with the channel structures.

15. The plate heat exchanger according to claim 1, wherein at least one of the plates has a yield strength of more than 100 MPa.

16. The plate heat exchanger according to claim 1, wherein at least one of the plates has a yield strength of more than 140 MPa.

17. The plate heat exchanger according to claim 1, wherein at least one of the plates has a yield strength of more than 160 MPa.

* * * * *